(12) United States Patent
Zhu

(10) Patent No.: US 9,342,803 B2
(45) Date of Patent: May 17, 2016

(54) DIAGNOSE SYSTEM FOR REARRANGING ORDER OF TESTING ITEMS IN DIAGNOSE PROGRAM IN ACCORDANCE WITH A LOG FILE

(71) Applicants: Inventec Appliances (Pudong) Corporation, Shanghai (CN); INVENTEC APPLIANCES CORP., New Taipei (TW); INVENTEC APPLIANCES (SHANGHAI) CO., LTD., Shanghai (CN)

(72) Inventor: Jianjun Zhu, Shanghai (CN)

(73) Assignees: INVENTEC APPLIANCES (PUDONG) CORPORATION, Shanghai (CN); INVENTEC APPLIANCES CORP., Taipei County (TW); INVENTEC APPLIANCES (SHANGHAI) CO., LTD., Shanghai (CN)

( * ) Notice: Subject to any disclaimer, the term of this patent is extended or adjusted under 35 U.S.C. 154(b) by 733 days.

(21) Appl. No.: 13/766,365

(22) Filed: Feb. 13, 2013

(65) Prior Publication Data

US 2013/0231895 A1    Sep. 5, 2013

(30) Foreign Application Priority Data

Mar. 1, 2012    (CN) .......................... 2012 1 0051023

(51) Int. Cl.
  *G06F 11/30*    (2006.01)
  *G06Q 10/04*    (2012.01)
  *G06F 11/263*    (2006.01)

(52) U.S. Cl.
  CPC ............. *G06Q 10/04* (2013.01); *G06F 11/263* (2013.01)

(58) Field of Classification Search
  CPC .............................. G06Q 10/04; G06F 11/263
  USPC .......................................................... 702/183
  See application file for complete search history.

(56) References Cited

U.S. PATENT DOCUMENTS

| | | | | |
|---|---|---|---|---|
| 6,002,868 A * | 12/1999 | Jenkins | ................. | G06F 11/263 702/118 |
| 6,453,435 B1 * | 9/2002 | Limon, Jr. | ......... | G01R 31/31912 714/724 |
| 2002/0091966 A1 * | 7/2002 | Barton | .................. | G06F 11/006 714/25 |
| 2006/0036907 A1 * | 2/2006 | Inscoe | .................... | G06F 11/263 714/12 |
| 2009/0307763 A1 * | 12/2009 | Rawlins | .............. | G06F 11/2294 726/5 |
| 2012/0117424 A1 * | 5/2012 | Ben-Yehuda | ......... | G06F 11/263 714/26 |

* cited by examiner

*Primary Examiner* — Sujoy Kundu
*Assistant Examiner* — Ricky Ngon
(74) *Attorney, Agent, or Firm* — Muncy, Geissler, Olds & Lowe PC

(57) ABSTRACT

Disclosed is a diagnose system for rearranging order of testing items in a diagnose program and a method thereof. The method is applicable to a diagnose system, including an electronic device to be tested, a storage component and a plurality of detecting apparatuses. The electronic device to be tested includes an interface and stores a diagnose program including a plurality of testing items. The storage component is electrically coupled to the electronic device to be tested through the interface for reading a log file that includes a plurality of invocation commands, so that the electronic device to be tested can sequentially execute each of the invocation commands to invoke the corresponding testing items. Each of the detecting apparatuses corresponds to at least one testing item so as to drive each of the detecting apparatuses and execute a corresponding testing process to the electronic device to be tested.

4 Claims, 5 Drawing Sheets

```
/*GPS*/
filename:GPS_Criteria.txt
default:
40
60
4
1
0

/*L sensor*/
filename:L_Sensor_Criteria.txt
default:
300
30
5
50
1200

/*RunIn*/
filename:RunIn_Criteria.txt
default:
12
1
1
1
0
0
    .
    .
    .
    .
```

FIG. 3

DIAGNOSE SYSTEM FOR REARRANGING ORDER OF TESTING ITEMS IN DIAGNOSE PROGRAM IN ACCORDANCE WITH A LOG FILE

CROSS-REFERENCE TO RELATED APPLICATION

This application claims the benefit of China Patent Application No. 201210051023.6, filed on Mar. 1, 2012, in the State Intellectual Property Office of the People's Republic of China, the disclosure of which is incorporated herein in its entirety by reference.

BACKGROUND OF THE INVENTION

1. Field of the Invention

The present invention relates to a diagnose system for rearranging order of testing items in a diagnose program in accordance with a log file and method thereof. The method is applicable to the diagnose system, such that when an electronic device to be tested executes a plurality of invocation commands stored in the log file, the electronic device to be tested can invoke corresponding testing items and drive each corresponding detecting apparatus to sequentially execute the testing process towards the electronic device to be tested in accordance with the order of each of the invocation commands.

2. Description of the Related Art

Nowadays, as science and technology advance and the way of consumption changes, competitions among companies become increasingly severer. Unlike the past, the industrial structure of research and design, hardware and software manufacture, assembly, production, testing and distribution of a product are single-handedly performed by a single company from upstream to downstream, companies have adopted a model of cooperation in specialized division of labor in order to lower the cost, optimize the allocation of resources and satisfy the requirements of customers rapidly. The non-core businesses is operated by outsourcing, and specialized core technologies are utilized for executing development and innovation of each program so as to reduce the operational cost and enhance the company's competitiveness. Therefore, the conventional vertically-integrated corporate chain structure is gradually loosened, and the horizontally-integrated corporate chain structure focusing on standardization and specialized division of labor has become a main industrial structure of today.

In the past, by virtue of the advantage of the production cost, Taiwan played an important role in the value chain of global electronic and information industries through the computer OEM (Original Equipment Manufacturer) industry. However, the industrial environment nowadays can no longer have the competitive edge simply by the control of the production cost. As the mobile phone industry becomes the biggest market of the electronic and information industries, many major computer OEM manufacturers switch their main business to the mobile phone OEM business, except those who have started their mobile phone OEM business from the very beginning. Although the upstream-downstream horizontally division-of-labor mode of the mobile phone industry is very close to the computer industry, the business operation mode of the computer OEM industry cannot be completely duplicated to the mobile phone OEM industry. In the computer industry, Microsoft and Intel established standardized system interfaces and specifications of various software and hardware, so that when various products are changing, the specifications do not change too much or become too complicated so as to facilitate the highly division of labor in different stages of components, assembling, testing, and sales and marketing in the computer industry. In the mobile phone industry, because of that no standard specification has been established yet, and that affected by a large number of monopolistic patents and technologies, products from different manufacturers individually form different systems. As a result, manufacturers of upstream and downstream have to perform lots of tests and communications before finding the most suitable operation mode to maximize the profit of both upstream and downstream manufacturers. Therefore, whether or not a manufacturer has sufficient flexibility to cooperate with other manufacturers appropriately is a key for the manufacturer to be competitive in the industry, and directly affects the position of the manufacturer in the industrial division-of-labor network.

During a product development process, upstream manufacturers in charge of research & development generally request downstream manufacturers to run a trial production and obtain a prototype of the newly developed product. In addition to using the prototype for further tests, the downstream manufacturers may learn about the features of the new product as soon as possible during the trial production in order to adjust the manufacturing procedure of the production line and prepare for the mass production. In general, before entering into the trial production, upstream manufacturers code a diagnose program according to an estimated testing sequence or a specification during the research & development of the product and install the diagnose program to the product directly, so that downstream manufacturers can test the product by the diagnose program provided by the upstream manufacturers during the trial production. However, no one can control the features of the product completely before the trial production, and downstream manufacturers usually find the differences between the testing sequence or specification estimated by the upstream manufacturer and the best production conditions of the actual operation until the stage of performing the trial production. If the originally estimated testing sequence does not fit the manufacturer's production line well or meet the requirements of the manufacturing process or the integrating testing of the manufacturer, the manufacturer may waste too much labor, time and time cost in the trial production process. At the time, even if the downstream manufacturer requests the upstream manufacturer to modify the diagnose program, the upstream manufacturer may not be willing to make the modification based on the consideration of the labor and the time cost. If the originally predicted testing sequence is not reasonable, the testing will be infeasible. At this point, the downstream manufacturer has to request the upstream manufacturer to modify the diagnose program through the communication and coordination before the production line can start the second trial production, which is very time-consuming. Even worse, different problems may not show up at the same time. For example, the problems occurred in the first trial production can be overcome by modifying the diagnose program, the manufacturers may encounter other problems being not discovered previously in the following trial productions. As a result, the downstream manufacturer has to spend much time to communication and coordinate with the upstream manufacturer repeatedly, which leads to a serious burden of labor and time cost on both upstream and downstream manufacturers. If delays the schedule of shipping the products, this may cause the upstream manufacturer to be unwilling to work with the same downstream manufacturer and seriously affect the competitiveness of the manufacturers. In summation of the description above, the conventional diagnose system lacks flexibility, and thus it is difficult for manufacturers to make a quick response to the rapid changes of new products, which significantly affects the manufacturers' competitiveness. Therefore, it is a main subject for related manufactures to overcome the aforementioned problem by an easy and simple method, so as to enhance the flexibility of the diagnose system and provide sufficient capability of the diagnose system to make adjustments quickly for the rapid changing new products.

SUMMARY OF THE INVENTION

The conventional diagnose system is lack of flexibility, not only wasting a manufacturer's labor and time cost for the testing process, but also requiring lots of time for communication and coordination between upstream and downstream manufacturers, which delays the schedule of launching new product to market, leading to a tremendous loss of the manufacturers and very unsatisfactory. In view of the drawbacks of the conventional diagnose system, the inventor of the present invention based on years of experience in the related industry to conduct extensive researches and experiments, and finally developed a diagnose system for rearranging order of testing items in a diagnose program in accordance with a log file and a method thereof, in hope of overcoming the drawbacks of lacking flexibility in the conventional diagnose system and improving the competitiveness of the manufacturers.

To achieve the foregoing objective, the present invention provides a diagnose system for rearranging testing items in a diagnose program in accordance with a log file, and the diagnose system comprises an electronic device to be tested (such as a mobile phone or a notebook computer), a storage component (such as a memory card or a flash memory supporting hot-plug) and a plurality of detecting apparatuses. Wherein, the electronic device to be tested is provided by an upstream design company and comes with a pre-installed diagnose program. The diagnose program has a plurality of testing items (such as a GPS test, a Bluetooth test, a light sensor test, etc.), and each of the testing items includes at least one testing parameter (such as a reference value of the number of satellites required to achieve the standard signal intensity in the GPS test). A log file is coded by the manufacturer and stored in the storage component, and the storage component is electrically coupled to the electronic device to be tested through the interface, so that the electronic device to be tested can read and execute the log file through an interface (such as a card reader or a USB slot) disposed in the electronic device to be tested. The log file includes a plurality of invocation commands, and each of the invocation commands corresponds to at least one testing item. When the electronic device to be tested executes the log file, the invocation commands are executed sequentially, and the corresponding testing items can be invoked according to the sequence of the invocation commands.

Each detecting apparatus is provided for testing the electronic device to be tested, and each detecting apparatus corresponds to at least one testing item. After invoking the corresponding testing items by the electronic device to be tested, the electronic device to be tested can drive the detecting apparatus to execute a corresponding testing process to the electronic device to be tested according to the corresponding testing parameter in the testing item. If a manufacturer wants to adjust the sequence of executing each the testing process, the manufacturer only needs to change the sequence of the invocation commands in the log file within the storage component, and then electrically connects the storage component to the interface, so that the electronic device to be tested can read and execute the invocation commands sequentially through the interface and invoke each the corresponding testing item. The electronic device to be tested may further drive each detecting apparatus to execute each the corresponding testing process according to the adjusted sequence without the need of modifying the diagnose program. Thus, if the manufacturer considers that it is necessary to adjust the sequence of executing the testing process in the trial production process, the aforementioned method and diagnose system of the present invention may rapidly introduce the new execution sequence into the production line and immediately conduct verifications and follow-up adjustments, so as to enhance the working efficiency of the production line significantly.

Another objective of the present invention, in addition to the log file, at least one parameter configuration files may be coded by the manufacturers and stored in the storage component. Each of the parameter configuration files corresponds to one of the invocation commands, respectively. With the corresponding invocation command, each of the parameter configuration files can correspond to each of the testing items, respectively. Each of the parameter configuration files includes at least one parameter command. Between the corresponding parameter configuration files and the testing items, each of the parameter commands corresponds to each of the testing parameters. The electronic device to be tested can sequentially read each of the parameter commands through the interface and further modify the testing parameter corresponding to the parameter command so as to enable each of the detecting apparatus to execute each of the testing process according to each of the modified testing parameters. Therefore, not only the sequence of executing each of the testing items in the diagnose system can be adjusted by the method of the present invention, but also each of the testing parameters of each of the testing items can be adjusted.

BRIEF DESCRIPTION OF THE DRAWINGS

FIG. 3 is a schematic view of the content of a log file of the present invention;

DETAILED DESCRIPTION OF THE PREFERRED EMBODIMENTS

The technical characteristics, contents, advantages and effects of the present invention will be apparent with the detailed description of a preferred embodiment accompanied with related drawings as follows. It is noteworthy that same numerals are used to represent respective elements in the following preferred embodiments.

Figure 1:
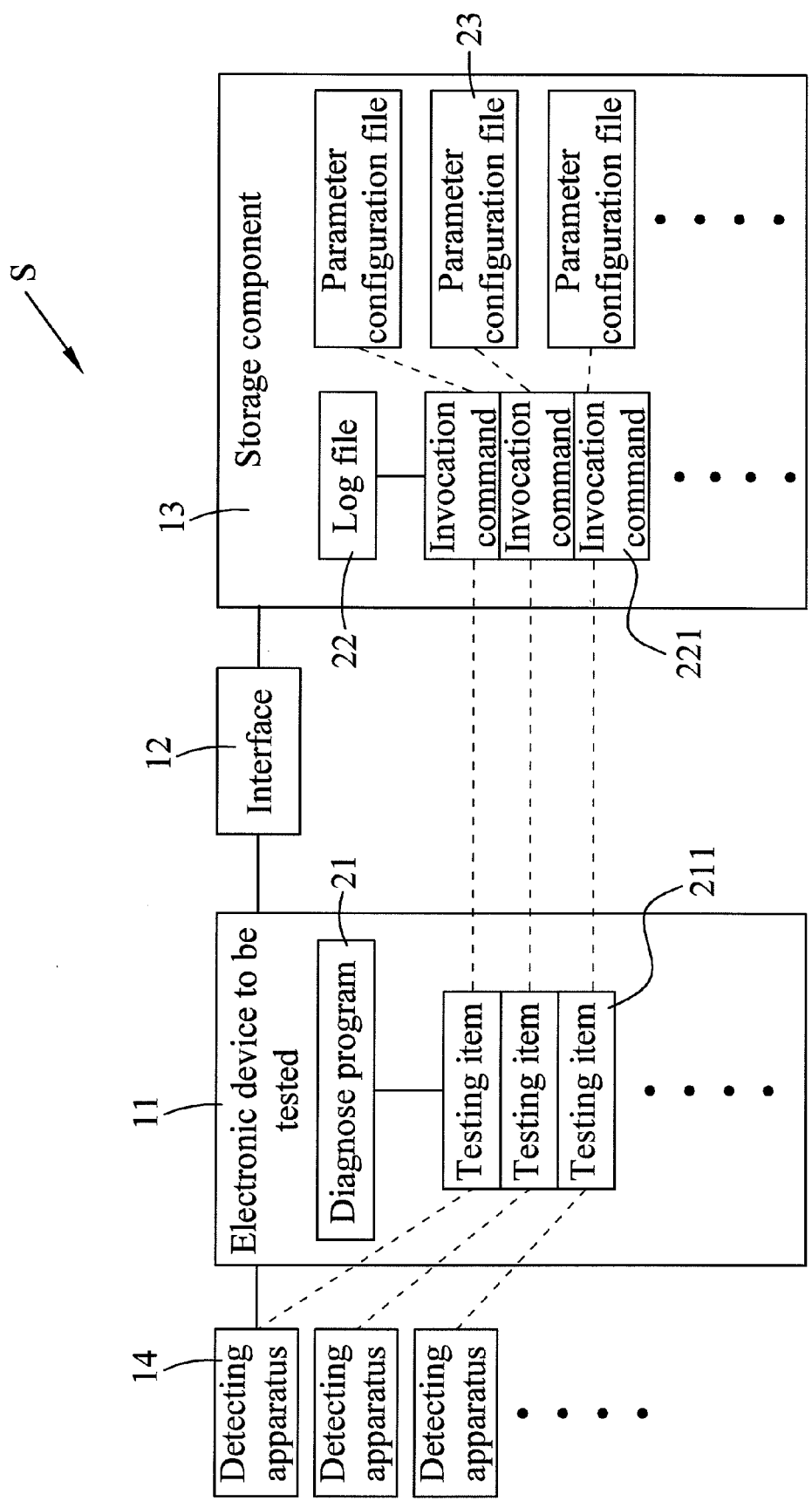
FIG. 1 is a schematic view of a diagnose system of the present invention.

The present invention is a method of rearranging order of testing items in a diagnose program in accordance with a log file. With reference to FIG. 1, the method is applicable to a diagnose system S, which can be applied for functional test of the products during the trial production process, as well as for troubleshooting of the products during the maintenance and repair process. The diagnose system S comprises an electronic device to be tested 11, such as a mobile phone or a notebook computer, a storage component 13, such as a memory card or a flash memory supporting hot-plug, and a plurality of detecting apparatuses 14. The electronic device to be tested 11 has an interface 12, such as a card reader or a USB slot, and stores a diagnose program 21. The diagnose program 21 includes a plurality of testing items 211.

Figure 2:
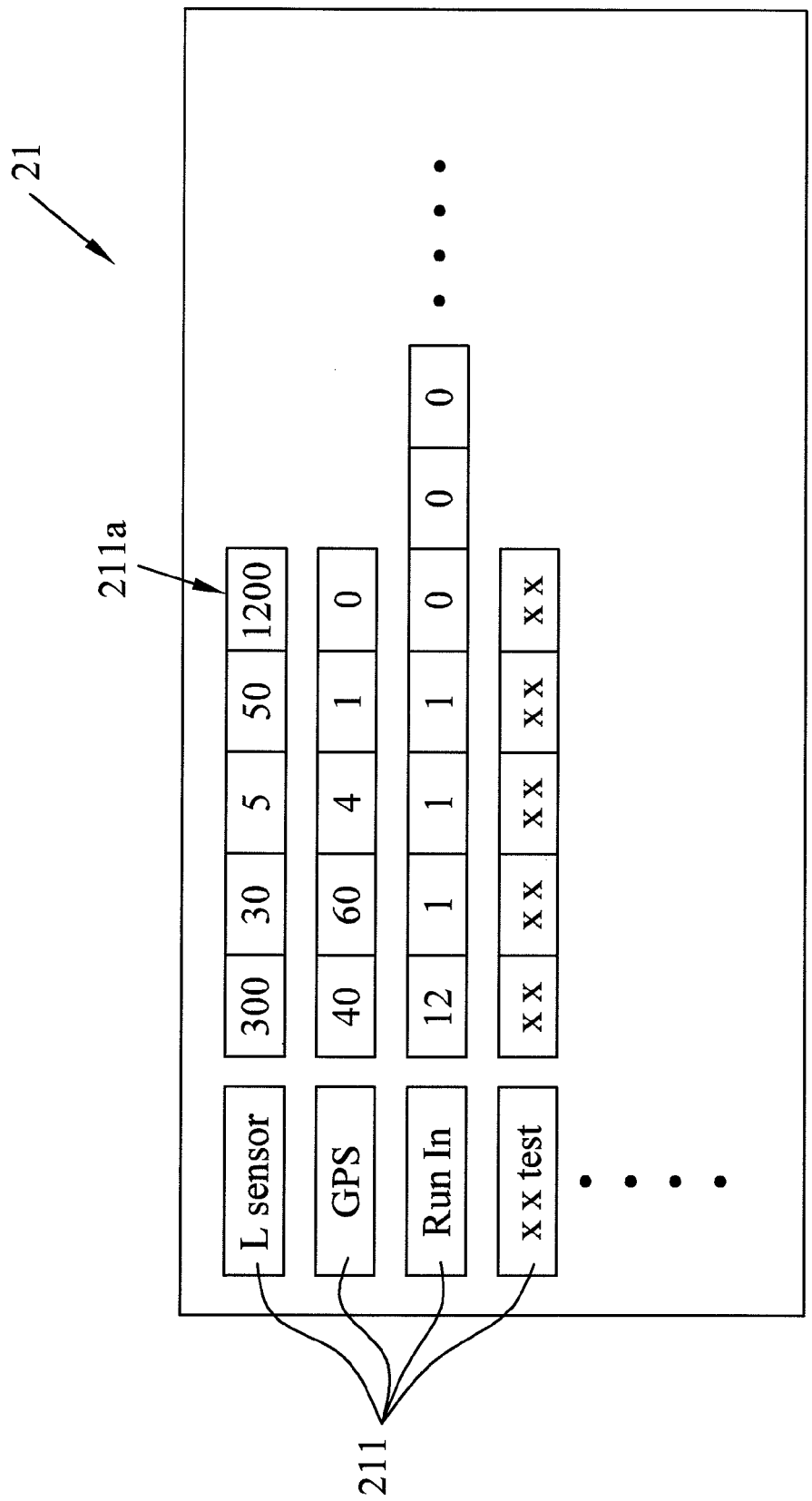
FIG. 2 is a schematic view of a diagnose program of the present invention.

With reference to FIG. 2 for a preferred embodiment of the present invention, each of the testing items 211 includes a light sensor test, a global positioning system (GPS) test, a run-in test, etc., and each of the testing items 211 includes at least one testing parameter 211a, respectively. In this preferred embodiment, a GPS test is demonstrated, and each of the testing parameter 211a is exemplified as follows:

(1) Signal intensity standard (which is 40 decibels herein) for determining whether or not a satellite is successfully connected to the electronic device to be tested 11;

(2) First positioning of the electronic device to be tested 11 must be completed within seconds (which is 60 seconds herein);

(3) Number of satellites successfully connected to the electronic device to be tested 11 (i.e. the number of satellites whose signal intensity achieves the standard set in (1), and this number is 4 herein);

(4) Whether a 3D positioning function is enabled (which is 1 herein, indicating that the positioning function is enabled); and (5) Whether a retry function is enabled (which is 0 herein, indicating that the retry function is disabled).

Referring to FIG. 1, a log file 22 is stored in the storage component 13, and the log file 22 includes a plurality of invocation commands 221. The storage component 13 is electrically coupled to the electronic device to be tested 11 through the interface 12 so that the electronic device to be tested 11 can read the log file 22 through the interface 12 and sequentially execute each of the invocation commands 221. With reference to FIGS. 2 and 3, each of the invocation commands 221 corresponds to at least one testing items 211, so that when each of the invocation commands 221 is executed, the corresponding testing items 211 can be invoked and executed according to the sequence of each of the invocation commands 221. Thus, in a preferred embodiment, each of the testing items 211 is executed according to the testing sequence of GPS, light sensor and Run In tests (the sequence of each of the invocation commands 221 as shown in FIG. 3) instead of the testing sequence of light sensor, GPS and Run In tests (the sequence of each of the testing items 211 as shown in FIG. 2).

Figure 4:
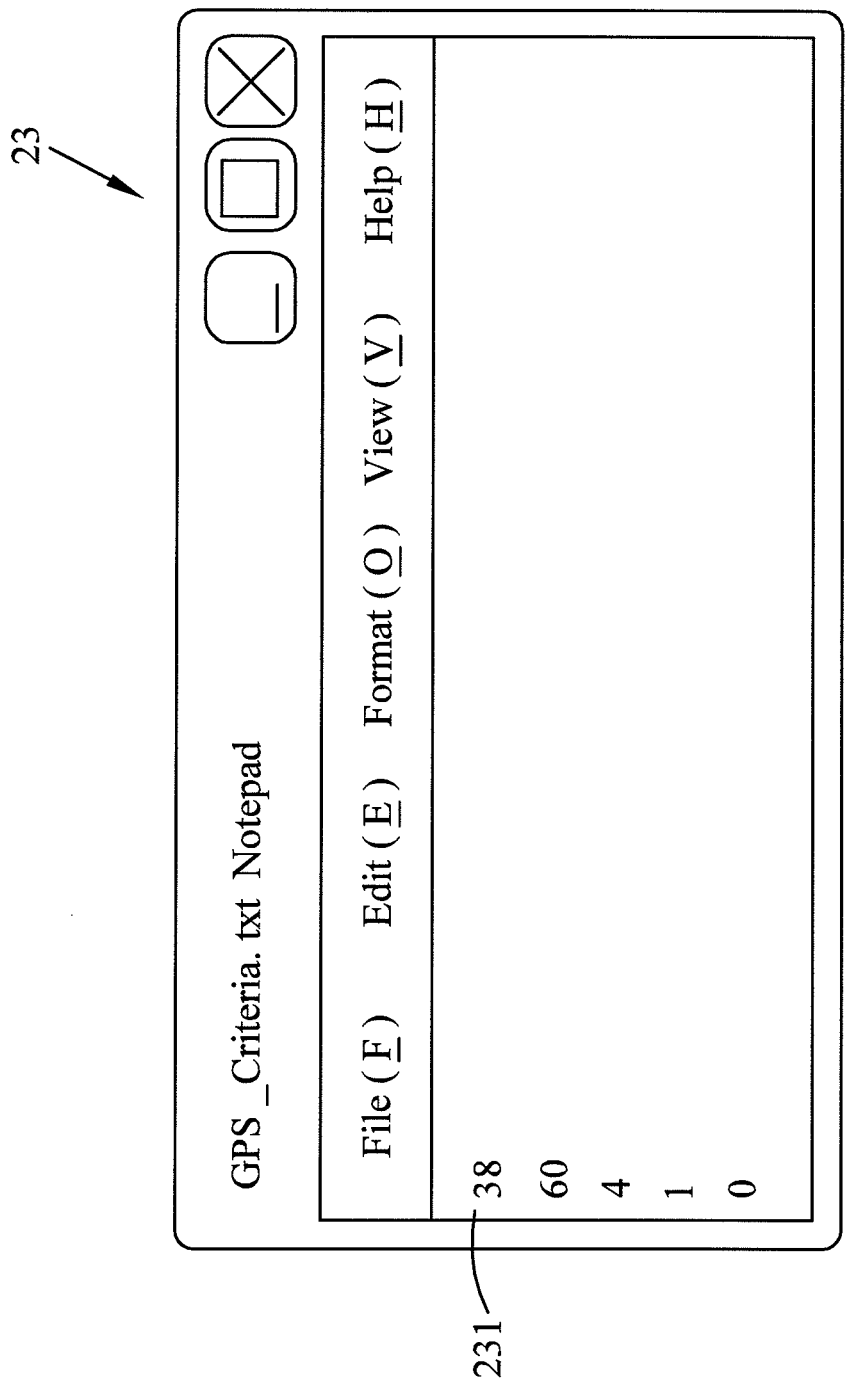
FIG. 4 is a schematic view of the content of a parameter configuration document of the present invention.

As shown in FIG. 1, the storage component 13 further includes at least one parameter configuration file 23, and each of the parameter configuration files 23 corresponds to an invocation command 221 and corresponds to each of the testing items 211 through the corresponding invocation command 221. With reference to FIG. 4, each of the parameter configuration files 23 includes at least one parameter command 231. Cross-referring to FIGS. 2 and 4, between the parameter configuration files 23 and the corresponding testing items 211, each of the parameter commands 231 corresponds to each of the testing parameters 211a. After reading the parameter commands 231 sequentially, the electronic device to be tested 11 (as shown in FIG. 1) can modify the testing parameters 211a corresponding to each of the parameter commands 231 accordingly. In this preferred embodiment, the signal intensity standard of successfully connected to the satellites in the GPS test is modified from 40 to 38 by using the parameter commands 231 of the parameter configuration files 23.

Figure 5:
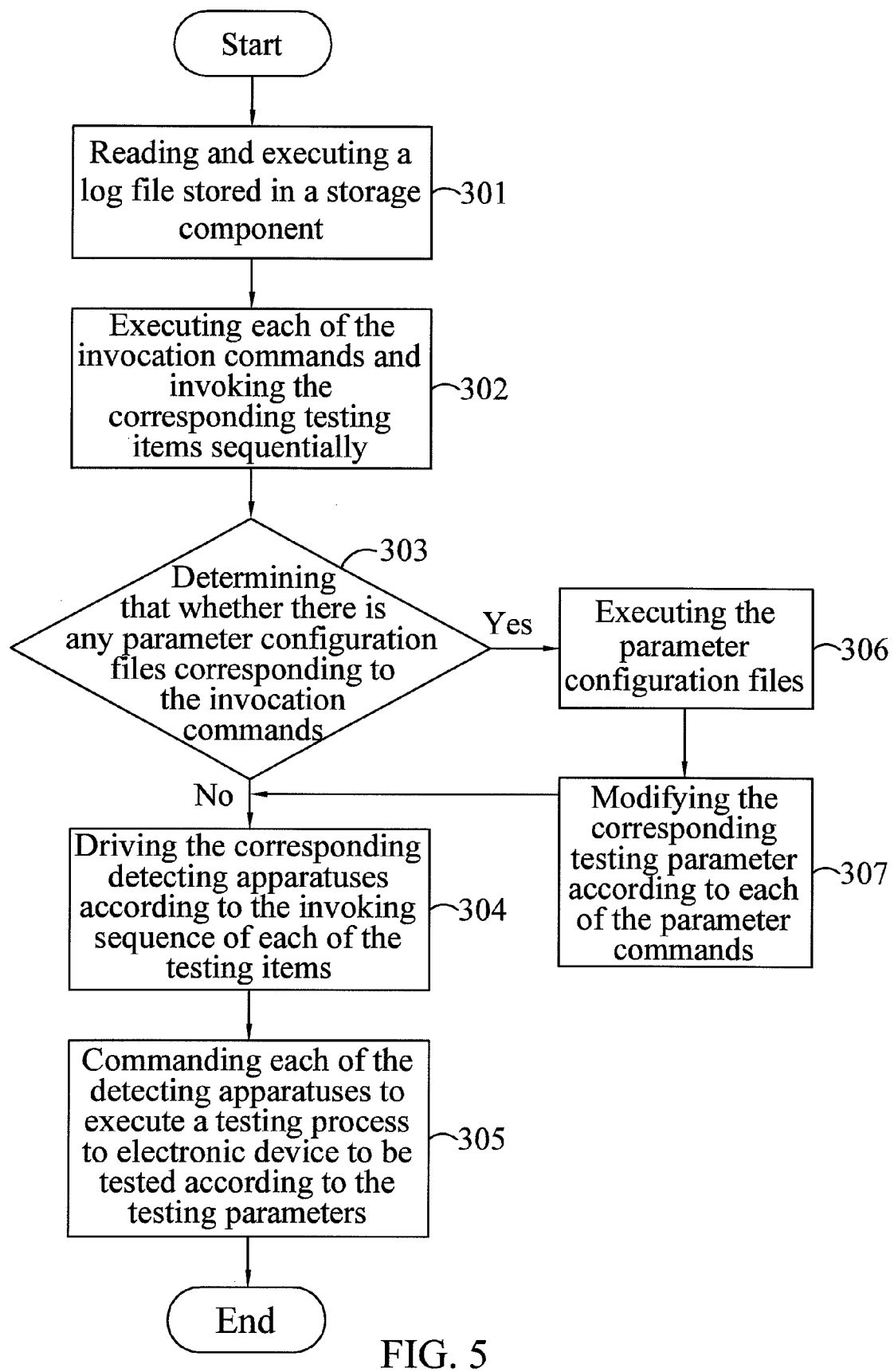
FIG. 5 is a flow chart of rearranging order of testing items applicable to a diagnose system of the present invention.

In FIG. 1, each of the detecting apparatuses 14 corresponds to at least one testing item 211. After invoking the corresponding testing items 211, each of the detecting apparatuses 14 can be driven by the electronic device to be tested 11 to execute a corresponding testing process according to the testing parameters 211a of the corresponding testing items 211 (as shown in FIG. 2). Therefore, when a testing technician wants to adjust the sequence of executing each of the testing process or modify each of the testing parameters 211a in a diagnose process, the testing technician simply needs to change the sequence of each of the invocation commands 221 in the log file 22 of the storage component 13 or edit each of the parameter commands 231 in each of the parameter configuration files 23 without the need of modifying the diagnose program 21. Subsequently, the storage component 13 is connected to the electronic device to be tested 11 through the interface 12, so that the electronic device to be tested 11 can carry out the following steps to adjust the sequence of each of the testing items 211 and modify each of the testing parameters 211a accordingly, as shown in FIG. 5.

(301) Reading and executing the log file 22 stored in the storage component 13.

(302) Invoking the testing items 211 corresponding to each of the invocation commands 221 in the diagnose program 21 sequentially according to the sequence of each of the invocation commands 221 in the log file 22.

(303) Determining whether there is any parameter configuration files 23 corresponding to the invocation command 221 according to the content of the log file 22; if yes, go to Step (306), or else go to Step (304).

(306) Executing the parameter configuration files 23, and go to Step (307).

(307) Modifying a testing parameter 211a of the testing item 211 corresponding to the parameter configuration files 23 according to each of the parameter commands 231 in the parameter configuration files 23, and then go to Step (304).

(304) Driving a corresponding detecting apparatus 14 to test the electronic device to be tested 11 according to the invoked sequence of each of the testing items 211.

(305) Commanding each of the detecting apparatuses 14 to execute a testing process to the electronic device to be tested 11 according to each of the modified testing parameter 211a.

Accordingly, with the simple flow as described above, the method of the present invention can be applicable to the diagnose system S, such that manufacturers can introduce the new testing sequence or testing specification into the production line immediately. When problems are found during the trial production process, the manufacturers can rapidly respond to the problem and directly verify the problem, so as to significantly reduce the labor and time cost for solving the problem.

While the invention has been described by means of specific embodiments, numerous modifications and variations could be made thereto by those skilled in the art without departing from the scope and spirit of the invention set forth in the claims.

What is claimed is:

1. A diagnose system for rearranging order of testing items in a diagnose program in accordance with a log file, comprising:
   an electronic device to be tested, wherein the electronic device to be tested has an interface, the diagnose program including a plurality of testing items is stored in the electronic device to be tested, and each of the testing items respectively comprises a testing parameter;
   a storage component, wherein the log file is stored in the storage component, the log file includes a plurality of invocation commands and each of the invocation commands corresponds to at least one of the testing items, the storage component is electrically coupled to the electronic device to be tested through the interface to enable the electronic device to be tested reading the log file via the interface and sequentially proceeding each of the invocation commands for making the electronic device to be tested invoke corresponding ones of the testing items while executing the invocation commands; and a plurality of detecting apparatus, each of the detecting apparatus being corresponding to at least one of the testing items, wherein after the corresponding ones of the testing items are invoked by the electronic device to be tested, each of the detecting apparatus is driven to perform a corresponding testing process toward the electronic device to be tested in accordance with testing parameters corresponding to the testing items;

wherein the storage component comprises at least one parameter configuration file, each of the parameter configuration files respectively corresponds to one of the invocation commands and further corresponds to each of the testing items there through, each of the parameter configuration files comprises at least one parameter command, between the parameter configuration files and the corresponding ones of the testing items, each of the parameter commands corresponds to each of the testing parameters, and the electronic device to be tested sequentially reads each of the parameter commands through the interface and further modifies the corresponding ones of the testing parameters to enable each of the detecting apparatus performing a corresponding one of the testing processes toward the electronic device to be tested in accordance with each modified ones of the corresponding testing parameters.

2. The diagnose system of claim 1, wherein the storage component is a memory card.

3. The diagnose system of claim 1, wherein the storage component is a flash memory supporting hot plug-in.

4. A method for rearranging order of testing items in a diagnose program in accordance with a log file, applicable to a diagnose system comprising an electronic device to be tested, a storage component and a plurality of detecting apparatus, the method comprising:

proceeding the diagnose program which is stored in the electronic device to be tested, wherein a plurality of testing items are disposed within the diagnose program, and each of the testing item respectively comprises at least one testing parameter;

reading the log file stored inside the storage component through an interface of the electronic device to be tested, wherein the log file comprises a plurality of invocation commands, and each of the invocation commands corresponds to at least one of the testing items;

proceeding each of the invocation commands sequentially and invoking the corresponding ones of the testing items in accordance with the invocation commands; and driving each of the detecting apparatus and respectively performing a corresponding testing process toward the electronic device to be tested in accordance with the testing parameters of each of the testing items which correspond to each of the invocation commands, and each of the detecting apparatus corresponds to at least one of the testing items;

wherein the storage component comprises at least one parameter configuration file, each of the parameter configuration files respectively corresponds to the invocation command and respectively through the corresponding ones of the invocation commands corresponding to each of the testing items, each of the parameter configuration files comprises at least one parameter command, between the parameter configuration files and the corresponding ones of the testing items, each of the parameter commands corresponds to each of the testing parameters and the electronic device to be tested sequentially reads each of the testing parameters via the interface and further modifies the corresponding ones of the testing parameters to make each of the detecting apparatus perform the corresponding testing process in accordance with each modified ones of the corresponding testing parameters.

* * * * *